United States Patent
Zhao et al.

(10) Patent No.: US 12,049,557 B2
(45) Date of Patent: Jul. 30, 2024

(54) BI-CONTINUOS EPOXY MICROSTRUCTURE FOR FABRICATION OF DEGRADABLE THERMOSET COMPOSITE USED IN HTHP DOWNHOLE CONDITIONS

(71) Applicants: CNPC USA Corp., Houston, TX (US); BEIJING HUAMEI, INC., Beijing (CN); CHINA NATIONAL PETROLEUM CORPORATION, Beijing (CN)

(72) Inventors: Lei Zhao, Houston, IL (US); Jiaxiang (Jason) Ren, Houston, IL (US); Peng Cheng, Houston, TX (US); Huailiang Liu, Beijing (CN)

(73) Assignees: CNPC USA CORP., Houston, TX (US); BEIJING HUAMEI, INC., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 390 days.

(21) Appl. No.: 17/369,571

(22) Filed: Jul. 7, 2021

(65) Prior Publication Data
US 2023/0022703 A1 Jan. 26, 2023

(51) Int. Cl.
*C08L 63/00* (2006.01)

(52) U.S. Cl.
CPC ........... *C08L 63/00* (2013.01); *C08L 2205/03* (2013.01); *C08L 2205/16* (2013.01)

(58) Field of Classification Search
USPC ................. 523/427; 525/481, 524
See application file for complete search history.

(56) References Cited

U.S. PATENT DOCUMENTS

| | | | |
|---|---|---|---|
| 6,462,107 B1 * | 10/2002 | Sinclair | G03F 7/038 523/456 |
| 8,742,018 B2 * | 6/2014 | Reynolds | C08G 59/24 525/122 |
| 9,617,462 B2 | 4/2017 | Tashiro et al. | |
| 10,458,197 B2 | 10/2019 | Khatiwada et al. | |
| 2015/0210846 A1 * | 7/2015 | Qi | H01B 3/40 523/427 |

* cited by examiner

*Primary Examiner* — Fred M Teskin
(74) *Attorney, Agent, or Firm* — Frank Gao, Esq.

(57) ABSTRACT

The patent application discloses a degradable thermoset composite. The composite comprises a reaction product of an epoxy resin mixture, a cross-linker, a catalyst. The epoxy resin mixture may comprise at least one aromatic epoxy resins having a glass transition temperature greater than or equal to 150° C. The reaction product may have a glass transition temperature greater than or equal to 110° C. as measured by DSC or DMA.

20 Claims, 4 Drawing Sheets

Component A:
High Tg epoxy with typically low degradation rate

Component B:
High degradation rate epoxy with typically low Tg

Catalyst:
Accelerate degradation rate

Fibers:
Increase mechanical property, forming fiber-polymer composite

BI-CONTINUOS EPOXY MICROSTRUCTURE FOR FABRICATION OF DEGRADABLE THERMOSET COMPOSITE USED IN HTHP DOWNHOLE CONDITIONS

The invention disclosure relates to thermoset resins, in particular, a novel bi-continuous epoxy microstructure for fabrication of degradable thermoset composite used in high temperature high pressure (HTHP) downhole conditions.

BACKGROUND

A wide variety of downhole tools may be used within a well bore in connection with producing hydrocarbons or reworking a well that extends into a hydrocarbon formation. Downhole tools such as frac plugs, bridge plugs, and packers, for example, may be used to seal a component against casing along the well bore wall or to isolate one pressure zone of the formation from another.

After the production or reworking operation is complete, these downhole tools must be removed from the well bore. Tool removal has conventionally been accomplished by complex retrieval operations, or by milling or drilling the tool out of the well bore mechanically. Thus, downhole tools are either retrievable or disposable. Disposable downhole tools have traditionally been formed of drillable metal materials such as cast iron, brass and aluminum.

Therefore, a need exists for degradable downhole tools that are reliably degradable without being milled or drilled out, and for methods of its use.

SUMMARY

In one aspect, one embodiment discloses a degradable thermoset composite. The composite comprises a reaction product of an epoxy resin mixture, a cross-linker, a catalyst, and a fiber enhancement. The epoxy resin mixture may comprise at least one aromatic epoxy resins having a glass transition temperature greater than or equal to 150° C. The reaction product may have a glass transition temperature greater than or equal to 110° C. as measured by DSC or DMA.

Optionally in any aspect, the reaction product of the degradable thermoset composite may have a tensile modulus of at least 145000 psi.

Optionally in any aspect, the reaction product of the degradable thermoset composite may have a tensile strength of at least 10000 psi.

Optionally in any aspect, the catalyst may comprise at least one of solid base or solid acid.

Optionally in any aspect, the epoxy resin mixture comprises at least one epoxy resins having a glass transition temperature lower than or equal to 100° C.

Optionally in any aspect, epoxy resin mixture further comprises a flexibilized epoxy resin.

Optionally in any aspect, the aromatic epoxy resin mixture may further comprise at least one of an epoxy phenolic novolac resin, an epoxy bisphenol-A novolac resin, a multifunctional epoxy resin, or combination thereof.

Optionally in one aspect, the degradable thermoset composition may degrade around 100° C. under water.

Optionally in any aspect, the epoxy resin mixture may further comprise at least one of a bisphenol-A based epoxy resin, bisphenol-F based epoxy resin, Aromatic Glycidyl Amines, or Phenolic Novolacs, or combination thereof; and a flexibilized epoxy resin.

Optionally in any aspect, the degradable thermoset composite may further comprise fibers, such as glass fibers, carbon fibers, aramid fibers.

Optionally in any aspect, the cross-linker may comprise a cycloaliphatic anhydride.

Further in another aspect, one embodiment discloses a process for forming a degradable thermoset composition. The method may comprise steps of admixing a first epoxy resin and a second epoxy resin to form a mixture, wherein the first epoxy resin has a higher glass transition temperature than the second epoxy resin; and adding a catalyst, and a cross-linker to form a curable composition, wherein the first epoxy resin comprises at least one cycloaliphatic epoxy resin having a glass transition temperature greater than or equal to 150° C.

Optionally in any aspects, the second epoxy resin may comprise a flexibilized epoxy resin.

Optionally in any aspects, the first epoxy resin may further comprise an epoxy phenolic novolac resin, an epoxy bisphenol-A novolac resin, a multifunctional epoxy resin or combination thereof.

Optionally in any aspects, the first epoxy resin may further comprise at least one of a bisphenol-A based epoxy resin, polyglycidyl ethers of phenolic novolacs, polyglycidyl ethers of cresolic novolacs, or combination thereof.

In yet another aspect, one embodiment discloses a degradable thermoset composite, comprising a reaction product of: an epoxy resin mixture, a cross-linker and a catalyst. The epoxy resin mixture may comprise at least a first epoxy resin and a second epoxy resin, the first epoxy resin has a glass transition temperature greater than that of the second epoxy resin.

Optionally in any aspect, the first epoxy resin may further comprise at least one of a bisphenol-A based epoxy resin.

Optionally in any aspect, the epoxy resin mixture may further comprise at least one of polyglycidyl ethers of phenolic novolacs, polyglycidyl ethers of cresolic novolacs, or combination thereof.

BRIEF DESCRIPTION OF THE DRAWINGS

In order to more clearly illustrate the technical solutions in the embodiments of the present disclosure or the exemplary techniques, the drawings to be used in the embodiments or the description of the exemplary embodiments will be briefly described below. Obviously, the drawings in the following description are only certain embodiments of the present disclosure, and other drawings may be obtained according to the structures shown in the drawings without any creative work for those skilled in the art.

Figure 1:
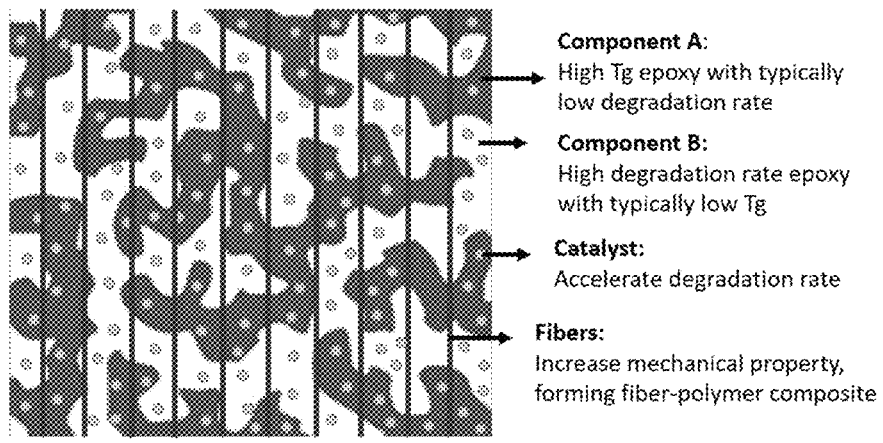
FIG. 1 shows microstructure illustration of novel degradable epoxy composite materials (not to scale)

The implementation, functional features and advantages of the present disclosure will be further described with reference to the accompanying drawings.

DETAILED EMBODIMENTS

Definitions

The term "about" means plus or minus 20%, more preferably plus or minus 10%, even more preferably plus or minus 5%, most preferably plus or minus 2%.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All patents, patent applications, and publications mentioned herein are incorporated herein by reference to the extent allowed by law for the purpose of describing and disclosing the compounds and methodologies reported therein that might be used with the present invention. However, nothing herein is to be construed as an admission that the invention is not entitled to antedate such disclosure by virtue of prior invention.

All percentages for weights expressed herein are by weight of the total food product unless specifically stated otherwise.

The technical means, creative features, objectives, and effects of the patent application may be easy to understand, the following embodiments will further illustrate the patent application. However, the following embodiments are only the preferred embodiments of the utility patent application, not all of them. Based on the examples in the implementation manners, other examples obtained by those skilled in the art without creative work shall fall within the protection scope of the present invention. The experimental methods in the following examples are conventional methods unless otherwise specified. The materials and reagents used in the following examples can be obtained from commercial sources unless otherwise specified.

The Inventions

Epoxies resins are one of the most widely used engineering resins, and are well-known for their use in composites with high strength fibers. Epoxy resins form a glassy network, exhibit excellent resistance to corrosion and solvents, good adhesion, reasonably high glass transition temperatures, and adequate electrical properties.

The impact strength, fracture toughness, ductility, as well as most other physical properties of crosslinked epoxy resins may be controlled by the chemical structure and ratio of the epoxy resin and cross-linker, by any added macroscopic fillers, toughening agents, and other additives, and by the curing conditions used. Typical performance requirements of thermoset resins, including epoxies, include a high softening point (>200° C.), low flammability, hydrolytic resistance, chemical and solvent resistance, and dielectric rigidity.

Performance criteria for the compositions during storage, cure, and for the thermoset resins formed from epoxies vary.

Despite the fact that degradable polymers or polymer composites are commercially available in fabrication of various downhole tools including degradable plug, they are mainly thermoplastics with temperature rating lower than 80° C. That cannot meet the needs in developing ultra-deep shale well with downhole temperature easily above 130° C. Thermoset polymers with high temperature rating are good candidates to meet this market. However, there is rarely any degradable thermoset polymer material reported able to survive that harsh condition except Cyanate Ester Composite developed by Baker Hughes. However, Cyanate Ester has extremely high cost and is also brittle in nature. To address this issue, cost-efficient epoxy material with high flexibility in material selections are extremely appealing.

For plug application, not only does it require a high glass transition temperature (Tg) for high temperature wells, but also needs degradation at relatively lower temperature, a contradicting requirements that cannot be met by any single epoxy materials. Because high Tg epoxy resin can hardly degrade at low temperature.

In one aspect, embodiments disclosed herein relate to curable compositions and thermoset resins formed from such curable compositions. The curable compositions, for example, may include an admixture of aromatic epoxy resins. Cross-linkers used in the curable compositions may include, for examples, cycloaliphatic anhydrides. In a family of embodiments, curable compositions disclosed herein may include an admixture of a) an aromatic epoxy resin; b) one or more of a flexibilized aliphatic resin, c) a catalyst; and d) one or more cycloaliphatic anhydride cross-linkers. The aromatic epoxy resin may further include an epoxy phenolic novolac resin, an epoxy bisphenol A novolac resin, a multifunctional epoxy resin, a bisphenol-A based epoxy resin, or a combination thereof.

Upon cure, such as a thermal cure, the resulting thermoset resins may have a good balance of physical properties, including a high glass transition temperature, a high tensile strength, a high tensile modulus, and degrading at low temperature in the water and salt.

A degradable thermoset composite may comprise a reaction product of an admixture of epoxy resin mixture, a cross-linker, and a catalyst. The epoxy resin mixture may comprise at least a first epoxy resin and a second epoxy resin. The first epoxy resin has a glass transition temperature greater than that of the second epoxy resin. The first epoxy resin may include an aromatic epoxy resin. The second epoxy resin may comprise one or more of a flexibilized aliphatic resin. The degradable thermoset composite may have a tensile modulus of at least about 145000 psi in some embodiments. The aromatic epoxy resin may comprise an epoxy phenolic novolac resin, an epoxy bisphenol A novolac resin, a multifunctional epoxy resin, a bisphenol-A based epoxy resin, or combination thereof.

For plug application, not only does it require high Tg for HT wells, but also needs degradation at relatively lower temperature, a contradicting requirements that cannot be met by any single epoxy materials, because high Tg epoxy can hardly degrades at low temperature. To address this issue, a high Tg epoxy is blended with lower Tg epoxy, forming a unique bi-continuous microstructure as shown in FIG. 1. The high Tg epoxy (component A in FIG. 1) forms backbone, providing high mechanical strength at an elevated temperature, while low Tg epoxy (component B in FIG. 1) accelerating degradation rate, leading to fast dissolving at lower temperature. After dissolving of low Tg epoxy component, increased open channels and thus increased contact area could accelerate degradation rate of high Tg epoxy components, thus leading to a final degradation of bulk materials. In addition to provide more channels (thus significantly increased surface area) for higher Tg epoxy to degrade, the degraded product of lower Tg epoxy has been found to accelerate the degradation process of high Tg epoxy. As shown in FIG. 1, solid base or acid is used as catalyst (dots) to accelerate degradation rate, and fibers (e.g., glass, carbon fiber, aramid fibers, Kevlar, etc.) can be used as structural enhancement to make the so called fiber-polymer composites.

The disclosed invention embodiment provides a formulation to make cost-efficient degradable epoxy composites that can perform over 110° C. as temporary blocking tool, while degrades at lower temperature below 100° C. when the tools are no longer needed. That is the typical requirements to make downhole degradable plugs used in hydraulic fracturing ultra-deep and high temperature wells. So far, no polymer based degradable plug can achieve this in the market due to their low temperature rating (<80° C.).

Thermoset resins disclosed herein may have a glass transition temperature (Tg) of at least 150° C. in some embodiments, as measured by differential scanning calorimetry (DSC) or dynamic mechanical thermal analysis (DMTA; as per ASTM D5045). In other embodiments, thermoset resins disclosed herein may have a glass transition temperature of at least 175° C.; at least 200° C. in other embodiments; at least 210° C. in other embodiments; at least 220° C. in other embodiments; at least 224° C. in other embodiments; at least 225° C. in other embodiments; and at least 226° C. in yet other embodiments.

Measurement of glass transition temperature by DSC may be performed, for example, using a Q100 DSC from T.A. Instruments, set up for 10° C./min scans. Sample sizes is typically kept under 15 mg. Hermetic pans with holes punched in the lids may be used to contain the samples in the DSC cell. DSC scans are analyzed for final Tg using half extrapolated tangents (Tg analysis).

Measurement of glass transition temperature by DMTA may be performed, for example, as per ASTM D5045 at an angular frequency of 1 Hz and 0.1% strain, run on three rectangular samples. The temperature range chosen for these tests may be between 30 and 280° C. The sample size is typically 17 mm long, 13 mm wide and 4 mm thick. The samples are inserted between adjustable clamps and the clamps are closed using a torque wrench. The samples are then subjected to oscillations in bending mode. Samples are subjected to a dynamic temperature ramp at 3° C./min. A slower heating rate of 3° C./min may be employed to maintain thermal equilibrium and considering the thermal mass of the sample. Storage and Loss modulus as well as Tangent delta are recorded.

Thermoset resins disclosed herein may have a tensile modulus of at least 145000 psi, as measured according to ASTM D638, in some embodiments. In other embodiments, thermoset resins disclosed herein may have a tensile modulus of at least 146000 psi; at least 150000 psi in other embodiments; at least 160000 psi in other embodiments; and at least 170000 psi in yet other embodiments.

Thermoset resins disclosed herein may have a tensile strength of at least 10000 psi, as measured according to ASTM D638, in some embodiments. In other embodiments, thermoset resins disclosed herein may have a tensile strength of at least 12000 psi; at least 13000 psi in other embodiments; at least 14000 psi in other embodiments; and at least 15000 psi in yet other embodiments.

Thermoset resins disclosed herein may have an elongation at break of at least 1 percent, as measured according to ASTM D638, in some embodiments. In other embodiments, thermoset resins disclosed herein may have an elongation at break of at least 1.5 percent; at least 2 percent in other embodiments; at least 2.5 percent in other embodiments; and at least about 3 percent in yet other embodiments.

The component A epoxy (high Tg) forms backbone of bulk material and should be continuous and dominant phase, providing high mechanical strength at elevated temperature, while low Tg epoxy accelerating degradation rate, leading to fast dissolving at lower temperature. After dissolving of component B epoxy, increased open channels (open pores) and thus increased contact area could accelerate degradation rate of component A phase, thus leading to final degradation of bulk materials. To realize this, not any bi-continuous phase can achieve this. First of all, volume ratio of component A should be above at least 50%, higher the better for HT application as it provides the mechanical strength at elevated temperature. Besides, solid base (e.g., $Ca(OH)_2$, CaO, $Mg(OH)_2$, KOH, etc.) or solid acid (e.g., sulfamic acid) should be used as degradation catalyst.

The above described thermoset resins may be formed by admixing an epoxy resin mixture, a catalyst, and an aliphatic anhydride cross-linker to form a curable composition, and exposing the curable composition to elevated temperatures, such as greater than or equal to about 150° C. in some embodiments, greater than or equal to about 175° C. in other embodiments, and greater than or equal to about 200° C. in yet other embodiments. The curable compositions disclosed herein, as mentioned above, exhibit high reactivity, and curing of the compositions may be performed by exposing the curable compositions to the above described temperatures for a time period of less than or equal to about 5 minutes in some embodiments; less than or equal to about 3 minutes in other embodiments; less than or equal to about 2 minutes in other embodiments; less than or equal to about 1 minute in other embodiments; and less than or equal to about 45 seconds in yet other embodiments.

Figure 2:
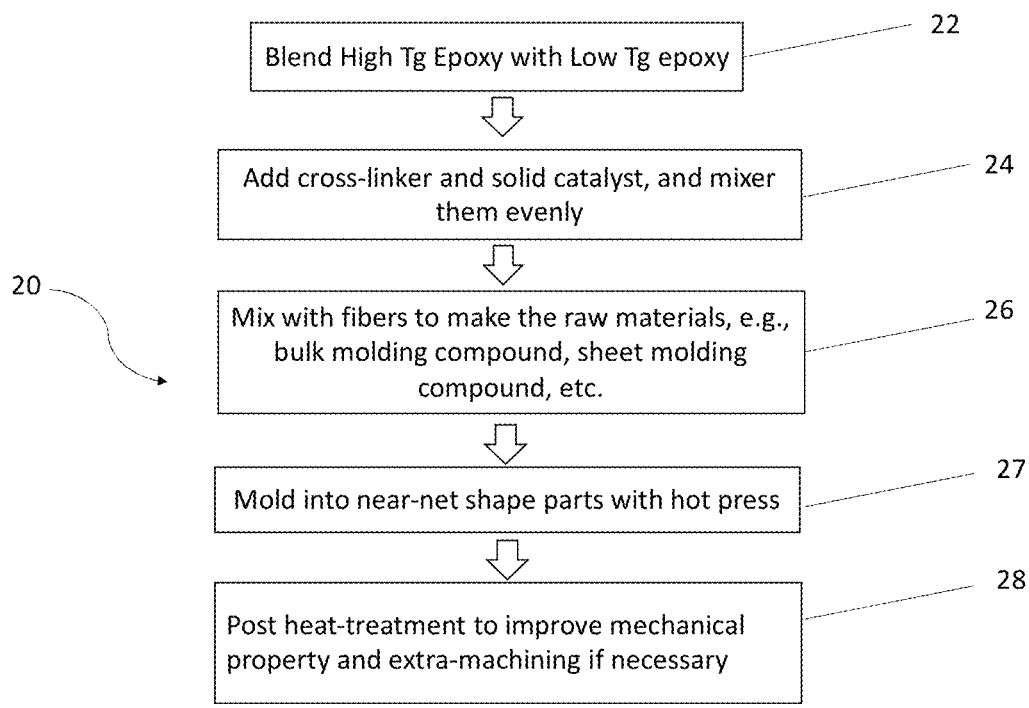
FIG. 2 is a process for forming a degradable thermoset composition according to an embodiment of the present disclosure.

More specifically, as shown in FIG. 2, a process 20 for forming a degradable thermoset composition may comprise steps of: blending a high Tg Epoxy with a low Tg epoxy in step 22; adding a cross-linker and solid catalyst, and mixer them evenly in step 24; mixing with fibers, such as glass fibers, carbon fibers, aramid fibers, for example, to make the raw materials, e.g., bulk molding compound, sheet molding compound, etc. in step 26; molding into near-net shape parts with hot press in step 27; and post heat-treatment to improve mechanical property and extra-machining if necessary in step 28.

To maintain mechanical strength at high temperature, content of low Tg epoxy needs to be below 50 wt %, above which the Tg of final composite is reduced dramatically. The higher content of how Tg epoxy, the higher Tg the final composites, however, the relatively lower the degradation rate is. In the second step, cross-linkers (acid anhydride) and solid catalyst powders are added and mix them evenly, the amount of cross-linker and solid catalyst is dependent on the requirement for degradation rate. Stoichiometric ratio between epoxy and cross-linker is typical used, up to 30% off is also accepted or used to tune mechanical strength. Weight ratio between organic resin (including cross-linker) and catalyst is between about 5:1 to about 2:1. With standard industrial method, fibers, such as glass fibers, carbon fibers, aramid fibers, for example, are then introduced inside to make so called bulk molding compound or sheet molding. The fiber volume loading may be between about 20% to about 60%, depending on the mechanical strength requirement. Finally, these raw material is cured under temperature and pressure (e.g., hot press process), formed so called fiber-enhanced composite parts. Post heat-treatment might be needed afterwards to improve mechanical property (i.e., reduce stress or increase cross-linking density). Extra-machining might also be necessary if net-shape cannot be molded directly.

As described above, curable compositions and thermoset resins may be formed from an epoxy resin mixture, including a mixture of aromatic epoxy resins or a mixture of at least a flexibilized epoxy resin with a bisphenol-A based epoxy resin and a cycloaliphatic anhydride cross-linker. Other epoxy resins, additional cross-linkers, catalysts, toughening agents, flame retardants, and other additives may also be used in compositions disclosed herein. Each of these is described in more detail below.

Flexibilized Epoxy Resin

Flexibilized epoxy resins useful in embodiments disclosed herein may include epoxy resins modified with glycols, such as an aliphatic epoxy modified with polypropylene glycol; epoxidized polybutadiene; epoxidized caprolactones and caprolactones, silicone resin containing epoxy functionality; and epoxy vinyl ester resins, among others. In some embodiments, flexibilized epoxy resins may include bis(3,4-epoxy-6-methylcyclohexylmethyl) adipate; bis(3,4-epoxycyclohexyl) adipate (available as ERL-4299 from The Dow Chemical Company, Midland, Mich.). In other embodiments, flexibilized epoxy resins may include (3'-4'-epoxycyclohexane)methyl 3'-4'-epoxycyclohexyl-carboxylate modified ξ-caprolactone (available as CELLOXIDE 2080 series from Daicel Chemical Industries, Ltd, Japan.).

Other flexibilized epoxy resins may include polymeric epoxies include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example.)

Other flexibilized epoxy resins may include glycidated resins, epoxidized oils, and so forth. The glycidated resins are frequently the reaction product of epichlorohydrin and a bisphenol compound, such as bisphenol A; C4 to C28 alkyl glycidyl ethers; C2 to C28 alkyl- and alkenyl-glycidyl esters; C1 to C28 alkyl-, mono- and poly-phenol glycidyl ethers; polyglycidyl ethers of polyvalent phenols, such as pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphynyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms. Other examples of epoxy resins useful in embodiments disclosed herein include bis-4,4'-(1-methylethylidene) phenol diglycidyl ether and (chloromethyl) oxirane Bisphenol A diglycidyl ether.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

Other flexibilized epoxy may include cycloaliphatic epoxy or acyclic aliphatic epoxy, for example. Cycloaliphatic epoxy resins that may be used in various embodiments disclosed herein are described in, for example, U.S. Pat. Nos. 6,329,475, 6,329,473, 5,783,713, 5,703,195, 5,646,315, 5,585,446, 5,459,208, and 4,532,299, among others.

Since main function of flexibilized epoxy is providing high dissolving or degrading rate, high Tg is not required. To improve dissolving or degrading rate, there are two strategies. One is epoxy with linear polymer chains, and another strategy is to choose epoxy with ester group in polymer chain. For practical application in plug market, this category of epoxy should be cost efficient, safe/easy processing, and commercially available in large scale. The following selections provides samples that can meet those requirements:

1. Polyglycidyl Ether of Substituted Glycerin

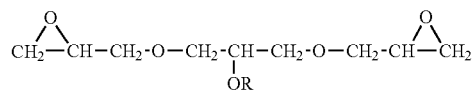

2. Phthalic Acid Diglycidyl Ester

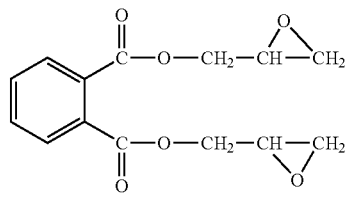 [SMILES: O=C(OCC1CO1)c1ccccc1C(=O)OCC1CO1]

3. Dimer Acid Diglycidyl Ester

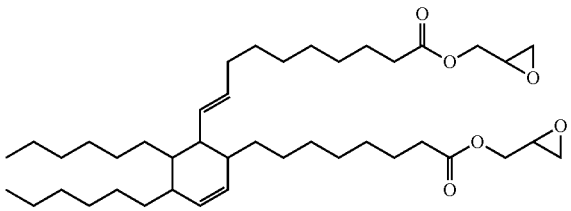 [SMILES: CCCCCCC1C=CC(CCCCCCCC(=O)OCC2CO2)C(/C=C/CCCCCCCC(=O)OCC2CO2)C1CCCCCC]

Novolac Resins and Multifunctional Epoxy Resins

Epoxy phenolic novolac resins useful in embodiments disclosed herein may include condensates of phenols with formaldehyde that are obtained under acid conditions, such as phenol novolacs, bisphenol A novolacs, and cresol novolacs.

Suitable multi-functional (polyepoxy) compounds may include resorcinol diglycidyl ether (1,3-bis-(2,3-epoxypropoxy)benzene), triglycidyl p-aminophenol (4-(2,3-epoxypropoxy)-N,N-bis(2,3-epoxypropyl)aniline), triglycidyl ether of meta- and/or para-aminophenol (3-(2,3-epoxypropoxy)N,N-bis(2,3-epoxypropyl)aniline), and tetraglycidyl methylene dianiline (N,N,N',N'-tetra(2,3-epoxypropyl) 4,4'-diaminodiphenyl methane), and mixtures of two or more polyepoxy compounds. A more exhaustive list of useful epoxy resins may be found in Lee, H. and Neville, K., *Handbook of Epoxy Resins*, McGraw-Hill Book Company, 1982 reissue.

Other suitable epoxy resins include polyepoxy compounds based on aromatic amines and epichlorohydrin, such as N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate. Epoxy resins may also include glycidyl derivatives of one or more of: aromatic diamines, aromatic monoprimary amines, aminophenols, polyhydric phenols, polyhydric alcohols, polycarboxylic acids.

Other suitable epoxy resins are disclosed in U.S. Pat. No. 5,112,932, which is incorporated herein by reference. Such epoxy resins may include epoxy terminated polyoxazolidone-containing compounds, including, for example, the reaction product of a polyepoxide compound with a polyisocyanate compound. Polyepoxides may include diglycidyl ether of 2,2-bis(4-hydroxyphenyl) propane (generally referred to as bisphenol A) and diglycidyl ether of 2,2-bis (3,5-dibromo-4-hydroxyphenyl) propane (generally referred to as tetrabromobisphenol A). Suitable polyisocyanates include 4,4'-methylene bis(phenylisocyanate) (MDI) and isomers thereof, higher functional homologs of MDI (commonly designated as "polymeric MDI"), toluene diisocyanate (TDI) such as 2,4-toluene diisocyanate and 2,6-toluene diisocyanate, m-xylylene diisocyanate, hexamethylene diisocyanate (HMDI) and isophoronediisocyanate.

Examples of epoxy phenolic novolac resins, epoxy bisphenol A novolac resins and multifunctional epoxy resins useful in various embodiments disclosed herein may include phenol-formaldehyde novolacs, such as those available under the tradenames D.E.N. 431 and D.E.N. 438 available from The Dow Chemical Company, Midland, Mich., and EPON SU-8, available from Hexion Specialty Chemicals.

Bisphenol A and Bisphenol F Based Epoxy Resins

Other epoxy resins that may be used in various embodiments disclosed herein include 4,4'-dihydroxydiphenyl dimethyl methane (or bisphenol A), bis(4-hydroxyphenyl)methane (known as bisphenol F), diglycidyl ether of bromobisphenol A (2,2-bis(4-(2,3-epoxypropoxy)3-bromophenyl)propane), diglycidyl ether of Bisphenol F (2,2-bis (p-(2,3-epoxypropoxy)phenyl)methane), and other epoxy resins based on bisphenol A and bisphenol F. Bisphenol-A based epoxy resins may include, for example, diglycidyl ethers of bisphenol A; D.E.R. 332, D.E.R. 383, and D.E.R. 331 from The Dow Chemical Company, Midland, Mich. Bisphenol-F based epoxy resins may include, for example, diglycidyl ethers of bisphenol-F, as well as D.E.R. 354 and D.E.R. 354LV, each available from The Dow Chemical Company, Midland, Mich.

Useful epoxy resins include, for example, polyglycidyl ethers of polyhydric polyols, such as ethylene glycol, triethylene glycol, 1,2-propylene glycol, 1,5-pentanediol, 1,2, 6-hexanetriol, glycerol, and 2,2-bis(4-hydroxy cyclohexyl) propane; di- or polyglycidyl ethers of polyhydric alcohols such as 1,4-butanediol, or polyalkylene glycols such as polypropylene glycol, polyhydric phenols include resorcinol, 2,2-bis(4'-hydroxy-3',5'-dibromophenyl)propane, 1,1,2, 2-tetrakis(4'-hydroxy-phenyl)ethane, polyglycidyl ethers of aliphatic and aromatic polycarboxylic acids, such as, for example, oxalic acid, succinic acid, glutaric acid, terephthalic acid, 2,6-naphthalene dicarboxylic acid, and dimerized linoleic acid; polyglycidyl ethers of polyphenols, such as, for example, 1,1-bis(4-hydroxyphenyl)ethane, 1,1-bis(4-hydroxyphenyl)isobutane, and 1,5-dihydroxy naphthalene; modified epoxy resins with acrylate or urethane moieties; glycidylamine epoxy resins; and novolac resins.

Since the targeting working temperature is from about 110 to about 175° C., considering the drop of Tg when blending with low Tg component, component A epoxy needs to have Tg at least about 150° C., preferable over about 180° C. Besides high Tg, for application in plug market, this category of epoxy should also be cost-efficient, safe/easy processing, and commercially available in large scale. The following selections provides samples that can meet those requirements:

2.1 Various Trademarks of Epoxy Resins Based on Bisphenol A Diglycidyl (BADGE) Ether are EPON® Resin Series, D.E.R® Series, Epotuff® Series, Araldite® Series, EPI-Rez® Series, and the ERL Bakelite® Epoxy Series

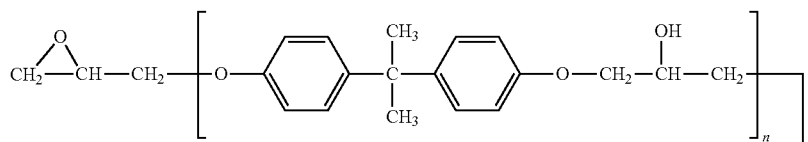

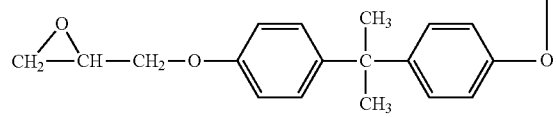

2.2 Polyglycidyl Ethers of Phenolic Novolacs and Polyglycidyl Ethers of Cresolic Novolacs

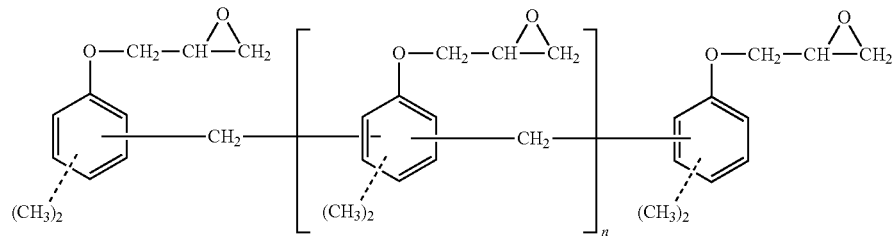

2.3 Aromatic Glycidyl Amines

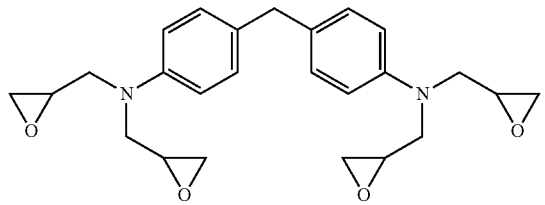 [SMILES: c1cc(N(CC2CO2)CC2CO2)ccc1Cc1ccc(N(CC2CO2)CC2CO2)cc1]

Anhydride Cross-Linker

Curable compositions disclosed herein may include one or more cycloaliphatic anhydride cross-linkers. Cycloaliphatic anhydride cross-linkers may include, for example, nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, and methyl tetrahydrophthalic anhydride, among others. Anhydride curing agents may also include copolymers of styrene and maleic acid anhydrides and other anhydrides as described in U.S. Pat. No. 6,613,839, which is incorporated herein by reference.

Most commercially available acid anhydride that is easy to process and cost efficient. The samples may include:

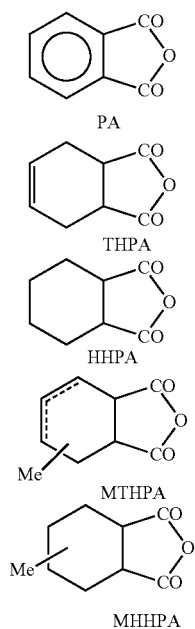

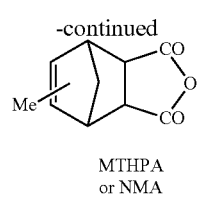

MTHPA
or NMA

Additional Epoxy Resins

Additional epoxy resins may be used to tailor the properties of the resulting thermoset resins as desired. The additional epoxy resin component may be any type of epoxy resin, including any material containing one or more reactive oxirane groups, referred to herein as "epoxy groups" or "epoxy functionality." Additional epoxy resins useful in embodiments disclosed herein may include mono-functional epoxy resins, multi- or poly-functional epoxy resins, and combinations thereof. Monomeric and polymeric epoxy resins may be aliphatic, aromatic, or heterocyclic epoxy resins. The epoxies may be pure compounds, but are generally mixtures or compounds containing one, two or more epoxy groups per molecule. In some embodiments, epoxy resins may also include reactive —OH groups, which may react at higher temperatures with anhydrides, organic acids, amino resins, phenolic resins, or with epoxy groups (when catalyzed) to result in additional crosslinking.

Other suitable epoxy resins are disclosed in, for example, U.S. Pat. Nos. 7,163,973, 6,887,574, 6,632,893, 6,242,083, 7,037,958, 6,572,971, 6,153,719, and 5,405,688, PCT Publication WO 2006/052727, and U.S. Patent Application Publication Nos. 20060293172 and 20050171237, each of which is hereby incorporated herein by reference.

Additional Cross-Linkers/Curing Agents

In addition to the dicyandiamide cross-linkers described above, additional cross-linkers or curing agents may also be provided for promoting crosslinking of the epoxy resin composition to form a polymer composition. As with the epoxy resins, the additional cross-linkers and curing agents may be used individually or as a mixture of two or more. The curing agent component (also referred to as a cross-linker or cross-linking agent) may include any compound having an active group being reactive with the epoxy group of the epoxy resin. The curing agents may include nitrogen-containing compounds such as amines and their derivatives; oxygen-containing compounds such as carboxylic acid terminated polyesters, anhydrides, phenol novolacs, bisphenol-A novolacs, DCPD-phenol condensation products, brominated phenolic oligomers, amino-formaldehyde condensation products, phenol, bisphenol A and cresol novolacs, phenolic-terminated epoxy resins; sulfur-containing compounds such as polysulfides, polymercaptans; and catalytic curing agents such tertiary amines, Lewis acids, Lewis bases and combinations of two or more of the above curing agents. Practically, polyamines, diaminodiphenylsulfone and their isomers, aminobenzoates, various acid anhydrides, phenol-novolac resins and cresol-novolac resins, for example, may be used, but the present disclosure is not restricted to the use of these compounds.

Other embodiments of cross-linkers that may be used are described in U.S. Pat. No. 6,613,839, and include, for example, copolymers of styrene and maleic anhydride having a molecular weight (MW) in the range of from 1500 to 50,000 and an anhydride content of more than 15 percent.

Other components that may be useful in the compositions disclosed herein include curing catalysts. Examples of curing catalyst include imidazole derivatives, tertiary amines, ammonium salts, phosphonium salts, and organic metallic salts. Other examples of such curing catalysts include free radical initiators, such as azo compounds including azoisobutyronitrile, and organic peroxides, such as tertiary-butyl perbenzoate, tertiary-butyl peroctoate, and benzoyl peroxide; methyl ethyl ketone peroxide, acetoacetic peroxide, cumene hydroperoxide, cyclohexanone hydroperoxide, dicumyl peroxide, and mixtures thereof. Methyl ethyl ketone peroxide and benzoyl peroxide are preferably used in the present invention.

In some embodiments, curing agents may include primary and secondary polyamines and their adducts, anhydrides, and polyamides. For example, polyfunctional amines may include aliphatic amine compounds such as diethylene triamine (D.E.H. 20, available from The Dow Chemical Company, Midland, Mich.), triethylene tetramine (D.E.H. 24, available from The Dow Chemical Company, Midland, Mich.), tetraethylene pentamine (D.E.H. 26, available from The Dow Chemical Company, Midland, Mich.), as well as adducts of the above amines with epoxy resins, diluents, or other amine-reactive compounds. Aromatic amines, such as metaphenylene diamine and diamine diphenyl sulfone, aliphatic polyamines, such as amino ethyl piperazine and polyethylene polyamine, and aromatic polyamines, such as metaphenylene diamine, diamino diphenyl sulfone, and diethyltoluene diamine, may also be used.

In some embodiments, the phenol novolac cross-linker may contain a biphenyl or naphthyl moiety. The phenolic hydroxy groups may be attached to the biphenyl or naphthyl moiety of the compound. This type of cross-linker may be prepared, for example, according to the methods described in EP915118A1. For example, a cross-linker containing a biphenyl moiety may be prepared by reacting phenol with bismethoxy-methylene biphenyl.

In other embodiments, curing agents may include boron trifluoride monoethylamine, and diaminocyclohexane. Curing agents may also include imidazoles, their salts, and adducts. These epoxy curing agents are typically solid at room temperature. One example of suitable imidazole curing agents includes 2-phenylimidazole; other suitable imidazole curing agents are disclosed in EP906927A1. Other curing agents include aromatic amines, aliphatic amines, anhydrides, and phenols.

In some embodiments, the curing agents may be an amino compound having a molecular weight up to 500 per amino group, such as an aromatic amine or a guanidine derivative. Examples of amino curing agents include 4-chlorophenyl-N,N-dimethyl-urea and 3,4-dichlorophenyl-N,N-dimethyl-urea.

Other examples of curing agents useful in embodiments disclosed herein include: 3,3'- and 4,4'-diaminodiphenylsulfone; methylenedianiline; bis(4-amino-3,5-dimethylphenyl)-1,4-diisopropylbenzene available as EPON 1062 from Shell Chemical Co.; and bis(4-aminophenyl)-1,4-diisopropylbenzene available as EPON 1061 from Shell Chemical Co.

Thiol curing agents for epoxy compounds may also be used, and are described, for example, in U.S. Pat. No. 5,374,668. As used herein, "thiol" also includes polythiol or polymercaptan curing agents. Illustrative thiols include aliphatic thiols such as methanedithiol, propanedithiol, cyclohexanedithiol, 2-mercaptoethyl-2,3-di mercaptosuccinate, 2,3-dimercapto-1-propanol(2-mercaptoacetate), diethylene glycol bis(2-mercaptoacetate), 1,2-dimercaptopropyl methyl ether, bis(2-mercaptoethyl)ether, trimethylolpropane tris (thioglycolate), pentaerythritol tetra(mercaptopropionate), pentaerythritol tetra(thioglycolate), ethyleneglycol dithioglycolate, trimethylolpropane tris(beta-thiopropionate), tris-mercaptan derivative of tri-glycidyl ether of propoxylated alkane, and dipentaerythritol poly(beta-thiopropionate); halogen-substituted derivatives of the aliphatic thiols; aromatic thiols such as di-, tris- or tetra-mercaptobenzene, bis-, tris- or tetra-(mercaptoalkyl)benzene, dimercaptobiphenyl, toluenedithiol and naphthalenedithiol; halogen-substituted derivatives of the aromatic thiols; heterocyclic ring-containing thiols such as amino-4,6-dithiol-sym-triazine, alkoxy-4,6-dithiol-sym-triazine, aryloxy-4,6-dithiol-sym-triazine and 1,3,5-tris(3-mercaptopropyl) isocyanurate; halogen-substituted derivatives of the heterocyclic ring-containing thiols; thiol compounds having at least two mercapto groups and containing sulfur atoms in addition to the mercapto groups such as bis-, tris- or tetra(mercaptoalkylthio)benzene, bis-, tris- or tetra(mercaptoalkylthio)alkane, bis(mercaptoalkyl) disulfide, hydroxyalkylsulfidebis(mercaptopropionate), hydroxyalkylsulfidebis(mercaptoacetate), mercaptoethyl ether bis(mercaptopropionate), 1,4-dithian-2,5-diolbis(mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bismuththiol and 2,5-dimercapto-1,3,4-thiadiazol.

The curing agent may also be a nucleophilic substance such as an amine, a tertiary phosphine, a quaternary ammonium salt with a nucleophilic anion, a quaternary phosphonium salt with a nucleophilic anion, an imidazole, a tertiary arsenium salt with a nucleophilic anion, and a tertiary sulfonium salt with a nucleophilic anion.

Aliphatic polyamines that are modified by adduction with epoxy resins, acrylonitrile, or (meth)acrylates may also be utilized as curing agents. In addition, various Mannich bases can be used. Aromatic amines wherein the amine groups are directly attached to the aromatic ring may also be used.

Figure 3:
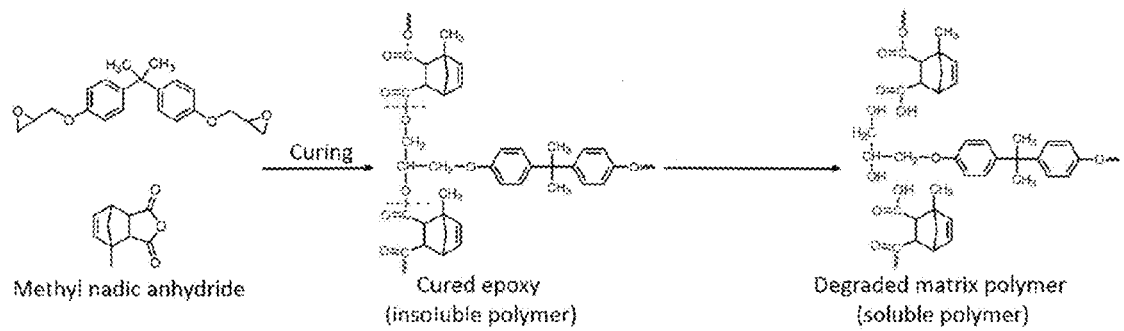
FIG. 3 shows a cure and hydrolysis process of BADGE epoxy resin with nadic methyl anhydride as cross-linker.
Figure 4:
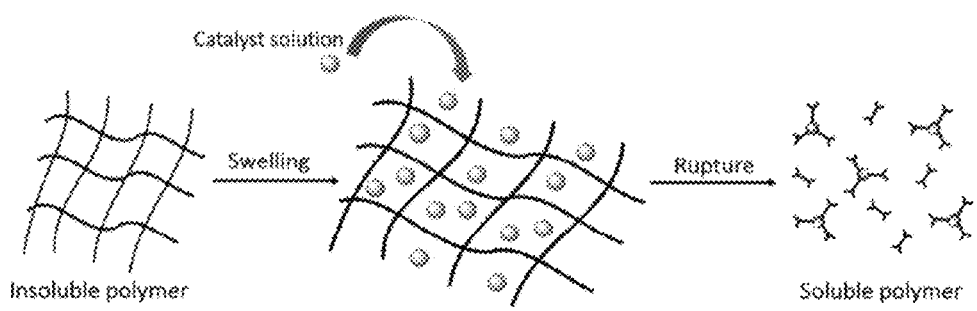
FIG. 4 shows schematic illustration of chemical degradation process of thermosetting polymer.

Quaternary ammonium salts with a nucleophilic anion useful as a curing agent in embodiments disclosed herein may include tetraethyl ammonium chloride, tetrapropyl ammonium acetate, hexyl trimethyl ammonium bromide, benzyl trimethyl ammonium cyanide, cetyl triethyl ammonium azide, N,N-dimethylpyrolidinium cyanate, N-methylpyridinium phenolate, N-methyl-o-chloropyridinium chloride, methyl viologen dichloride and the like. It has been well reported that epoxy can be cured by various chemistry, including amine, acid, etc. In order to make epoxy degradable, acid anhydride may be used as cross-linker to introduce ester bond into cross-linked polymer chain (FIG. 3, Middle). Ester can be broken though hydrolysis process as shown in FIG. 3 right. This process is typically slow and requires extremely high temperature to activate. To make the degradable process suitable for downhole application, we add solid base (e.g., $Ca(OH)_2$, CaO, $Mg(OH)_2$, KOH, etc.) as catalyst or filler to accelerate hydrolysis process in a process as illustrated in FIG. 4.

In some embodiments, at least one cationic photo initiator may be used. Cationic photo initiators include compounds that decompose when exposed to electromagnetic radiation of a particular wavelength or range of wavelengths to form a cationic species that may catalyze the polymerization reaction, such as between an epoxide group and a hydroxyl group. That cationic species may also catalyze the reaction of epoxide groups with other epoxide-reactive species contained in the curable composition (such as other hydroxyl groups, amine groups, phenolic groups, mercaptan groups, anhydride groups, carboxylic acid groups and the like). Examples of cationic photo initiators include diaryliodonium salts and triarylsulfonium salts. For example, a diaryliodonium salt type of photo initiator is available from Ciba-Geigy under the trade designation IRGACURE 250. A triarylsulfonium-type photo initiator is available from The Dow Chemical Company as CYRACURE 6992. The cationic photo initiator may be used in a catalytically effective amount, and may constitute up to about 10 weight percent of the curable composition.

Catalysts to Promote Reaction

In some embodiments, a catalyst may be used to promote the reaction between the epoxy resin component and the curing agent or cross-linker, including dicyandiamide and the phenolic cross-linker described above. Catalysts may include a Lewis acid, for example boron trifluoride, conveniently as a derivative with an amine such as piperidine or methyl ethylamine. Catalysts may also be basic, such as, for example, an imidazole or an amine. Other catalysts may include other metal halide Lewis acids, including stannic chloride, zinc chloride, and the like, metal carboxylate-salts, such as stannous octoate and the like; benzyl dimethylamine; dimethyl aminomethyl phenol; and amines, such as triethylamine, imidazole derivatives, and the like.

Tertiary amine catalysts are described, for example, in U.S. Pat. No. 5,385,990, incorporated herein by reference. Illustrative tertiary amines include methyldiethanolamine, triethanolamine, diethylaminopropylamine, benzyldimethyl amine, m-xylylenedi(dimethylamine), N,N'-dimethylpiperazine, N-methylpyrolidine, N-methyl hydroxypiperidine, N,N,N'N'-tetramethyldiaminoethane, N,N,N',N',N'-pentamethyldiethylenetriamine, tributyl amine, trimethyl amine, diethyldecyl amine, triethylene diamine, N-methyl morpholine, N,N,N'N'-tetramethyl propane diamine, N-methyl piperidine, N,N'-dimethyl-1,3-(4-piperidino)propane, pyridine and the like. Other tertiary amines include 1,8-diazobicyclo[5.4.0]-7-ene, 1,8-diazabicyclo[2.2.2]octane, 4-dimethylaminopyridine, 4-(N-pyrolidino)pyridine, triethyl amine and 2,4,6-tris(dimethylaminomethyl)phenol.

Catalysts to Help Degrade the Composite

As discussed previously, a solid base or solid acid including but not limited to $Ca(OH)_2$, CaO, $Mg(OH)_2$, KOH, NaOH, etc. Without catalyst, even the low Tg component B cannot be hydrolyzed.

Toughening Agents

Toughening agents may be used to prevent the composites disclosed herein from becoming brittle when the epoxy resin cures. In some embodiments, toughening agents may be rubber compounds and block copolymers. Toughening agents function by forming a secondary phase within the polymer matrix. This secondary phase is rubbery and hence is capable of crack growth arrestment, providing improved impact toughness.

Toughening agents used to improve fracture toughness of epoxies include FORTEGRA 100, block copolymers, CTBN, amphiphilic block copolymers, linear polybutadiene-polyacrylonitrile copolymers, oligomeric polysiloxanes, and organopolysiloxane resins. Other toughening agents may include carboxyl terminated butadiene, polysulfide-based toughening agents, amine-terminated butadiene nitrile, and polythioethers. Toughening agents are described in, for example, U.S. Pat. Nos. 5,262,507, 7,087,304 and 7,037,958, and U.S. Patent Application Publication Nos. 20050031870 and 20060205856, among others. Amphiphilic toughening agents are disclosed in, for example, PCT Patent Application Publications WO2006/052725, WO2006/052726, WO2006/052727, WO2006/052729, WO2006/052730, and WO2005/097893, U.S. Pat. No. 6,887,574, and U.S. Patent Application Publication No. 20040247881.

The amount of toughening agent used in the curable compositions described herein may depend on a variety of factors including the equivalent weight of the polymers, as well as the desired properties of the products made from the composition. In general, the amount of toughening agent may be from 0.1 weight percent to 30 weight percent in some embodiments, from 0.5 weight percent to 10 weight percent in other embodiments, and from 1 weight percent to 5 weight percent in yet other embodiments, based on the total weight of the curable composition.

Optional Additives

Curable compositions and thermoset resins disclosed herein may optionally include conventional additives and fillers. Additives and fillers may include, for example, other flame retardants, boric acid, silica, glass, talc, metal powders, titanium dioxide, wetting agents, pigments, coloring agents, mold release agents, coupling agents, ion scavengers, UV stabilizers, flexibilizing agents, and tackifying agents. Additives and fillers may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, and stabilizers, among others. Fillers and modifiers may be preheated to drive off moisture prior to addition to the epoxy resin composition. Additionally, these optional additives may have an effect on the properties of the composition, before and/or after curing, and should be considered when formulating the composition and the desired reaction product. Curable compositions disclosed herein may also optionally contain other additives of a generally conventional type including for example, stabilizers, other organic or inorganic additives, pigments, wetting agents, flow modifiers, UV light blockers, and fluorescent additives. These additives may be present in amounts of from 0 to 5 weight-percent in some embodiments, and less than 3 weight percent in other embodiments. Examples of suitable additives are also described in U.S. Pat. No. 5,066,735 and PCT/US2005/017954.

Curable Compositions

Curable compositions may be formed by combining a mixture of a) an aromatic epoxy resin, b) one or more of a flexibilized resin, c) a catalyst, and d) an anhydride cross-linker. An aromatic epoxy resin may include an epoxy phenolic novolac resin, an epoxy bisphenol A novolac resin, a multifunctional epoxy resin, a bisphenol-A or bisphenol F based epoxy resin, and a polyether polyol, for example. Additional cross-linkers, epoxy resins, catalysts, toughening agents and other additives may also be added, as described above. The relative proportions of the epoxy resin mixtures and the cycloaliphatic anhydride cross-linker may depend, in part, upon the properties desired in the curable composition or thermoset compositions to be produced, the desired cure response of the composition, and the desired storage stability of the composition (desired shelf life).

In some embodiments, the epoxy resin mixture (a mixture of aromatic epoxy and other epoxy resins as described above) may be present in the curable composition in an amount ranging from about 0.1 to about 99 weight percent of the curable composition, based on the total weight of the epoxy resin mixture, the catalyst and the anhydride cross-linker. In other embodiments, the epoxy composition may range from about 5 to about 95 weight percent of the curable composition; from about 15 to about 85 weight percent in other embodiments; from about 25 to about 75 weight percent in other embodiments; from about 35 to about 65 weight percent in other embodiments; and from about 40 to about 60 weight percent in yet other embodiments, where the above percentages are based on the total weight of the epoxy resin mixture, the catalyst, and the cycloaliphatic anhydride cross-linker.

In some embodiments, the anhydride cross-linker, such as cycloaliphatic cross-linkers, or a mixture of cycloaliphatic anhydride cross-linkers may be present in the curable composition in an amount ranging from 0.1 to 99 weight percent of the curable composition, based on the total weight of the epoxy resin mixture, the catalyst, and the cycloaliphatic anhydride cross-linker. In other embodiments, the cycloaliphatic anhydride cross-linker may range from 5 to 95 weight percent of the curable composition; from 15 to 85 weight percent in other embodiments; from 25 to 75 weight percent in other embodiments; from 35 to 65 weight percent in other embodiments; and from 40 to 60 weight percent in yet other embodiments, where the above percentages are based on the total weight of the epoxy resin mixture, the catalyst, and the cycloaliphatic anhydride cross-linker.

In some embodiments, a catalyst may be present in the curable composition in an amount ranging from 1 weight percent to 40 weight percent. In other embodiments, the catalyst may be present in an amount ranging from 2 weight percent to 30 weight percent; from 5 weight percent to 25 weight percent in other embodiments; and from 8 to 20 weight percent in yet other embodiments, where the above ranges are based on the total weight of the epoxy resin mixture, the catalyst, and the cycloaliphatic anhydride cross-linker.

Additional epoxy resins may be used in some embodiments of the curable compositions in an amount ranging from 0.01 weight percent to 20 weight percent, based on the total weight of the curable composition. In other embodiments, additional epoxy resins may be present in an amount ranging from 0.1 weight percent to 8 weight percent; from 0.5 weight percent to 6 weight percent in other embodiments; and from 1 to 4 weight percent in yet other embodiments.

Additional cross-linkers may be used in some embodiments of the curable compositions in an amount ranging from 0.01 weight percent to 20 weight percent, based on the total weight of the curable composition. In other embodiments, additional cross-linkers may be present in an amount ranging from 0.1 weight percent to 8 weight percent; from 0.5 weight percent to 6 weight percent in other embodiments; and from 1 to 4 weight percent in yet other embodiments.

Curable compositions may also include from about 0.1 to about 50 volume percent optional additives in some embodiments, based on the total volume of the curable composition. In other embodiments, curable compositions may include from about 0.1 to about 5 volume percent optional additives; and from about 0.5 to about 2.5 volume percent optional additives in yet other embodiments.

Composites and Coated Structures

In some embodiments, composites may be formed by curing the curable compositions disclosed herein. In other embodiments, composites may be formed by applying a curable composition to a substrate or a reinforcing material, such as by impregnating or coating the substrate or reinforcing material, and curing the curable composition.

The above described curable compositions may be in the form of a powder, slurry, or a liquid. After a curable composition has been produced, as described above, it may be disposed on, in, or between the above described substrates, before, during, or after cure of the curable composition.

For example, a composite may be formed by coating a substrate with a curable composition. Coating may be performed by various procedures, including spray coating, curtain flow coating, coating with a roll coater or a gravure coater, brush coating, and dipping or immersion coating.

In various embodiments, the substrate may be monolayer or multi-layer. For example, the substrate may be a composite of two alloys, a multi-layered polymeric article, and a metal-coated polymer, among others, for example. In other various embodiments, one or more layers of the curable composition may be disposed on or in a substrate. Other multi-layer composites, formed by various combinations of substrate layers and curable composition layers are also envisaged herein.

In some embodiments, the heating of the curable composition may be localized, such as to avoid overheating of a temperature-sensitive substrate, for example. In other embodiments, the heating may include heating the substrate and the curable composition.

Curing of the curable compositions disclosed herein may require a temperature of at least about 30° C., up to about 250° C., for periods of minutes up to hours, depending on the resin composition, cross-linker, and catalyst, if used. In other embodiments, curing may occur at a temperature of at least about 100° C., for periods of minutes up to hours. Post-treatments may be used as well, such post-treatments ordinarily being at temperatures between about 100° C. and 250° C.

In some embodiments, curing may be staged to prevent exotherms. Staging, for example, includes curing for a period of time at a temperature followed by curing for a period of time at a higher temperature. Staged curing may include two or more curing stages, and may commence at temperatures below about 180° C. in some embodiments, and below about 150° C. in other embodiments.

In some embodiments, curing temperatures may range from a lower limit of about 30° C., about 40° C., about 50° C., about 60° C., about 70° C., about 80° C., about 90° C., about 100° C., about 110° C., about 120° C., about 130° C., about 140° C., about 150° C., about 160° C., about 170° C., or about 180° C. to an upper limit of about 250° C., about 240° C., about 230° C., about 220° C., about 210° C., about 200° C., about 190° C., about 180° C., about 170° C., about 160° C., where the range may be from any lower limit to any upper limit.

The curable compositions and composites described herein may be useful as adhesives, structural and electrical laminates, coatings, castings, downhole temporary blocking agents, structures for the aerospace industry, and as circuit boards and the like for the electronics industry, except for downhole tools, among other applications. The curable compositions disclosed herein may also be used in electrical varnishes, encapsulants, semiconductors, general molding powders, filament wound pipe, storage tanks, liners for pumps, and corrosion resistant coatings, among others. In selected embodiments, the curable compositions described herein may be useful in the formation of resin coated foils, similar to those as described in U.S. Pat. No. 6,432,541, which is incorporated herein by reference.

Various processing techniques can be used to form composites containing the epoxy-based compositions disclosed herein. For example, filament winding, solvent prepregging, and pultrusion are typical processing techniques in which the uncured epoxy resin may be used. Moreover, fibers in the form of bundles may be coated with the uncured epoxy resin composition, laid up as by filament winding, and cured to form a composite.

Figure 5:
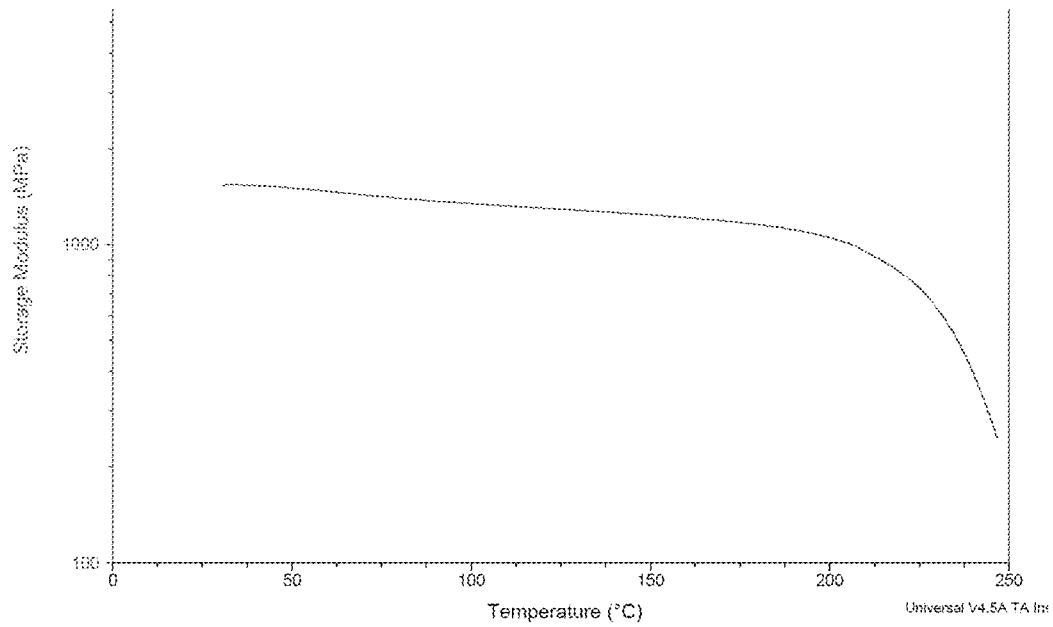
FIG. 5 shows DMA measurement of one degradable epoxy with extremely high temperature rating according to an embodiment of the present disclosure.
Figure 6:
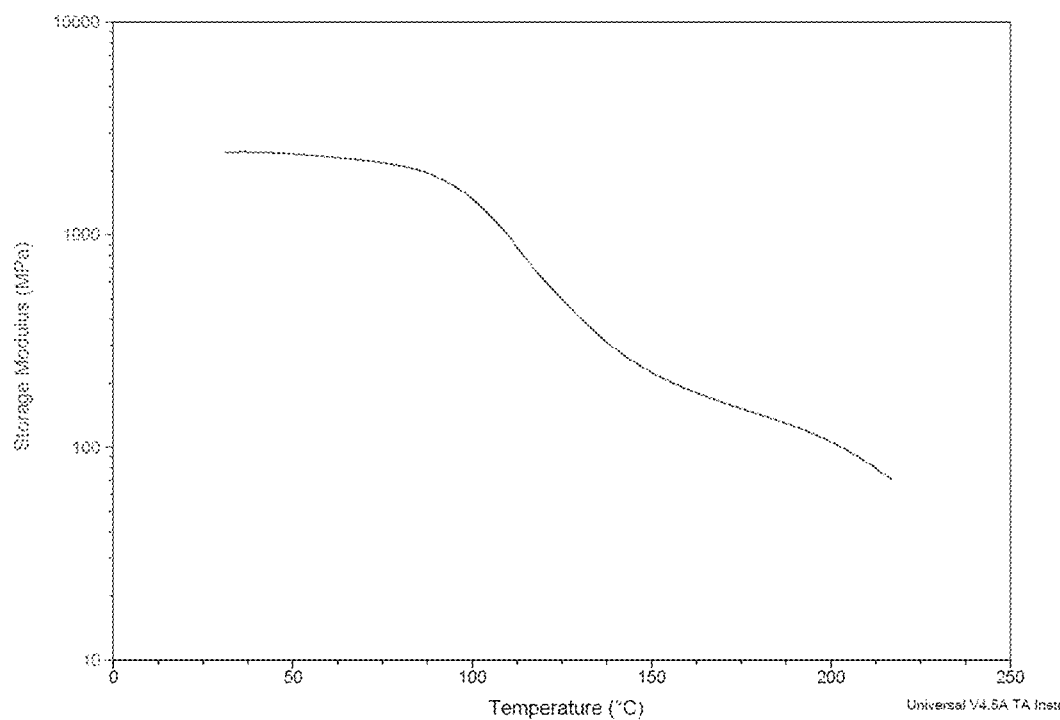
FIG. 6 shows DMA measurement of one degradable epoxy with medium-high temperature rating according to another embodiment of the present disclosure.

Glass transition temperature (Tg) of cured degradable may be tuned based on ratio between component A epoxy and component B epoxy, and component A volume fraction should be larger than 50%. As one example, the upper limit Glass transition temperature (Tg) of one formulation is shown in FIG. 5 with Tg around 200° C. (100% component A), and lower limit of Tg of this system is shown in FIG. 6 with Tg around 100° C. (50% component A and 50% component B).

Dissolving Property of Disclosed Degradable Epoxy

Figure 7:
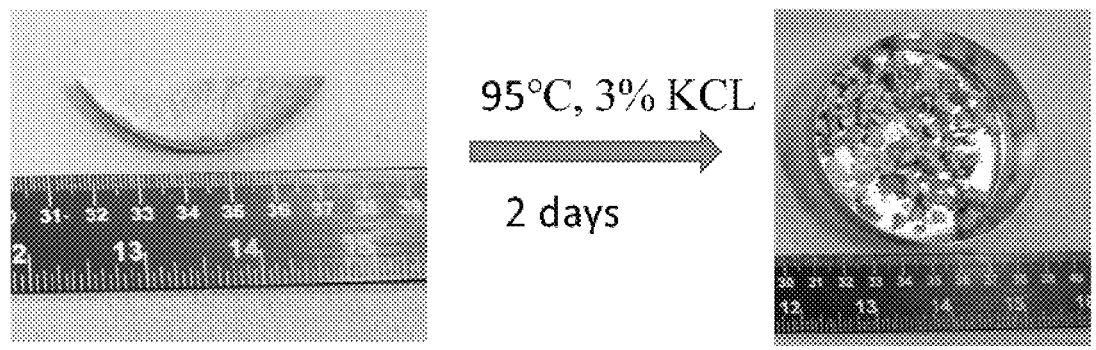
FIG. 7 shows degradation of one degradable epoxy formulation in brine at low temperature.
Figure 8:
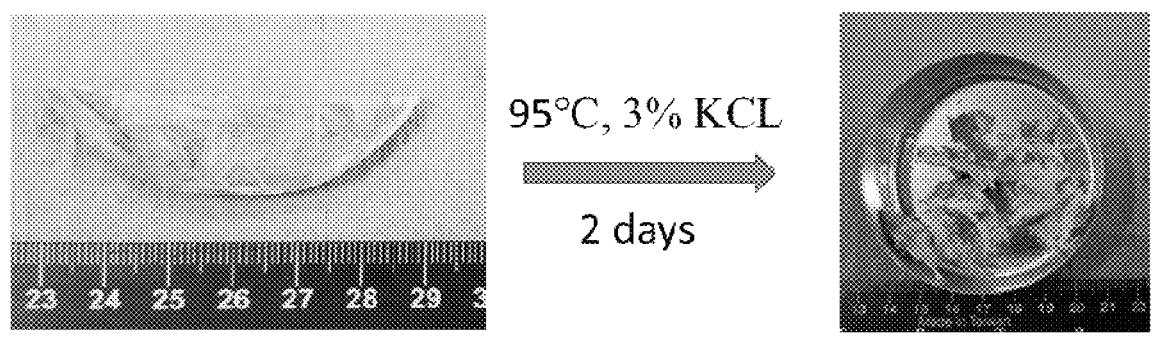
FIG. 8 shows degradation of fiber enhanced composite made of one degradable epoxy formulation in brine at low temperature.

As one example, one formulation of epoxy can degrade in brine after two days at temperature of 95° C. (FIG. 7). Tg of this composite are above 110° C.

Figure 9:
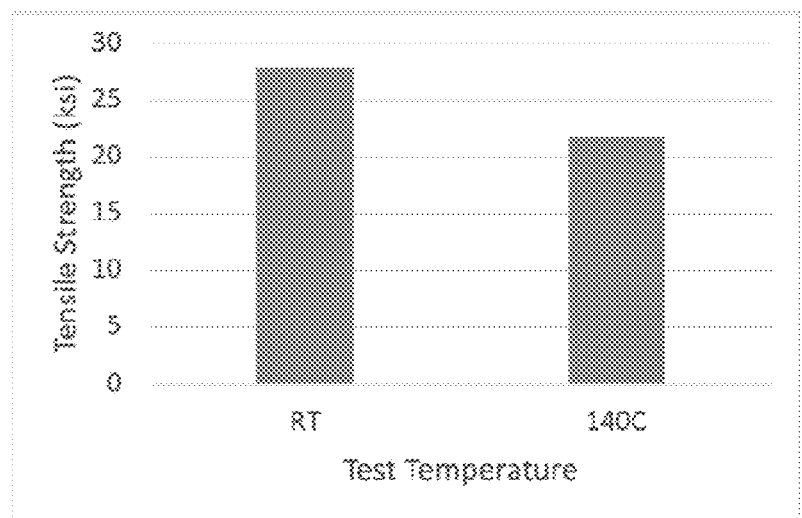
FIG. 9 shows tensile strength of proposed fiber enhanced thermoset composite at room temperature and high temperature.

After made into fiber enhanced composites, final composite material can also degrade in brine after two days at temperature of 95° C., leaving short fibers (FIG. 9).

Solid base catalyst is crucial to hydrolysis of both component A and component B. Without the catalyst, even component B cannot be degraded at either low or high temperature, not to mention high Tg component A. Test shows that both solid acid and solid base can catalyze the hydrolysis process. Solid base may be better because the material degrades in the form of surface-etching process, which does not deteriorate mechanical properties of whole material during degradation process.

The mechanical strength of final composite is dependent on various parameters including fiber selection, fiber length, fiber loading, bonding between fiber/matrix, molding process, etc. The typical tensile strength of proposed fiber is between about 10 ksi to about 30 ksi, and their mechanical strength does not deteriorate as long as it is below Tg (FIG. 9).

The above shows and describes the basic principles, main features and advantages of the utility patent application. Those skilled in the industry should understand that the present utility patent application is not limited by the above-mentioned embodiments. The above-mentioned embodiments and the description are only preferred examples of the present utility patent application and are not intended to limit the present utility patent application, without departing from the present utility patent application. Under the premise of spirit and scope, the present utility patent application will have various changes and improvements, and these changes and improvements fall within the scope of the claimed utility patent application. The scope of protection claimed by the utility patent application is defined by the appended claims and their equivalents.

We claim:

1. A degradable thermoset composite, comprising a reaction product of:
    an epoxy resin mixture, wherein the epoxy resin mixture comprises at least one aromatic epoxy resins having a glass transition temperature greater than or equal to about 150° C.;
    a cross-linker; and
    a catalyst for accelerating hydrolysis of the thermoset composite, wherein the catalyst comprises an inorganic material;
    wherein the degradable thermoset composite has a glass transition temperature greater than or equal to about 110° C. as measured by DSC or DMA.

2. The degradable thermoset composite of claim 1, wherein the reaction product has a tensile strength of at least about 10000 psi.

3. The degradable thermoset composite of claim 1, wherein the catalyst comprises at least one of solid base or solid acid.

4. The degradable thermoset composite of claim 1, wherein the epoxy resin mixture comprises at least one epoxy resins having a glass transition temperature lower than or equal to about 100° C.

5. The degradable thermoset composite of claim 1, wherein the epoxy resin mixture further comprises a flexibilized epoxy resin.

6. The degradable thermoset composite of claim 1, wherein the aromatic epoxy resin comprises at least one of an epoxy phenolic novolac resin, an epoxy bisphenol-A novolac resin, a multifunctional epoxy resin, or combination thereof.

7. The degradable thermoset composite of claim 1, wherein the degradable thermoset composite degrades below about 100° C. under water or brine.

8. The degradable thermoset composite of claim 1, wherein the aromatic epoxy resin comprises:
    at least one of a bisphenol-A based epoxy resin, bisphenol-F based epoxy resin, Aromatic Glycidyl Amines, or Phenolic Novolacs, or combination thereof.

9. The degradable thermoset composite of claim 1 further comprises fibers, wherein fibers are at least one of glass fibers, carbon fibers, aramid fibers, wherein loadings of fibers are from about 20% to about 60% in volume.

10. The degradable thermoset composite of claim 1, wherein the cross-linker comprises a cycloaliphatic anhydride.

11. A process for forming a degradable thermoset composition, the process comprising:
    admixing a first epoxy resin and a second epoxy resin to form a mixture, wherein the first epoxy resin has a higher glass transition temperature than the second epoxy resin; and
    adding a catalyst for accelerating hydrolysis of the thermoset composite, wherein the catalyst comprises an inorganic material, and a cross-linker to form a curable composition, wherein the first epoxy resin comprises at least one aromatic epoxy resin having a glass transition temperature greater than or equal to about 150° C.

12. The process of claim 11, wherein the $2^{nd}$ epoxy resin further comprises a flexibilized epoxy resin.

13. The process of claim 11, wherein the first epoxy resin further comprises an epoxy phenolic novolac resin, an epoxy bisphenol diglycidyl ether, a multifunctional epoxy resin or combination thereof.

14. The process of claim 11, wherein the first epoxy resin further comprises at least one of a bisphenol-A based epoxy resin, polyglycidyl ethers of phenolic novolacs, polyglycidyl ethers of cresolic novolacs, or combination thereof.

15. The process of claim 11, wherein the cross-linker comprises a cycloaliphatic anhydride.

16. The process of claim 11, wherein the degradable thermoset composite degrades below about 100° C. under water or brine.

17. A degradable thermoset composite, comprising a reaction product of:
   an epoxy resin mixture, wherein the epoxy resin mixture comprises at least a first epoxy resin and a second epoxy resin, wherein the first epoxy resin has a glass transition temperature greater than that of the second epoxy resin;
   a cross-linker; and
   a catalyst for accelerating hydrolysis of the thermoset composite, wherein the catalyst comprises an inorganic material.

18. The degradable thermoset composite of claim 17, wherein the first epoxy resin further comprises:
   at least one of a bisphenol-A based epoxy resin, bisphenol-F based epoxy resin, Aromatic Glycidyl Amines, or Phenolic Novolacs, or combination thereof.

19. The degradable thermoset composite of claim 17, wherein the cross-linker comprises a cycloaliphatic anhydride.

20. The degradable thermoset composite of claim 17, wherein the first epoxy resin comprises at least one of polyglycidyl ethers of phenolic novolacs, polyglycidyl ethers of cresolic novolacs, or combination thereof.

* * * * *